Feb. 16, 1960  J. E. LUCAS  2,925,245
PRESSURE SEALED AND LOCKED VALVES
Filed July 21, 1953  2 Sheets-Sheet 1
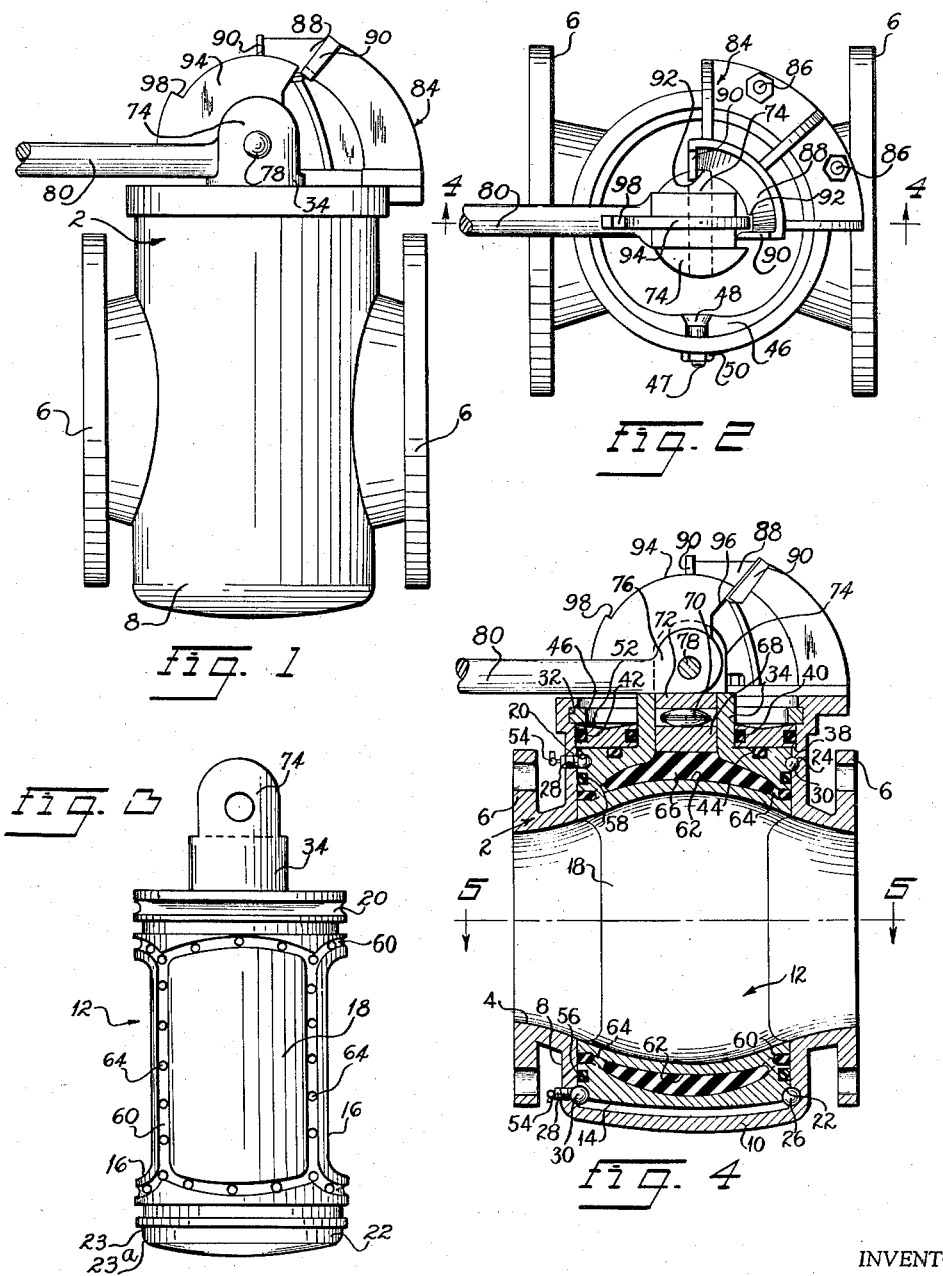
INVENTOR
JOSEPH E. LUCAS
BY Bacon & Thomas
ATTORNEYS

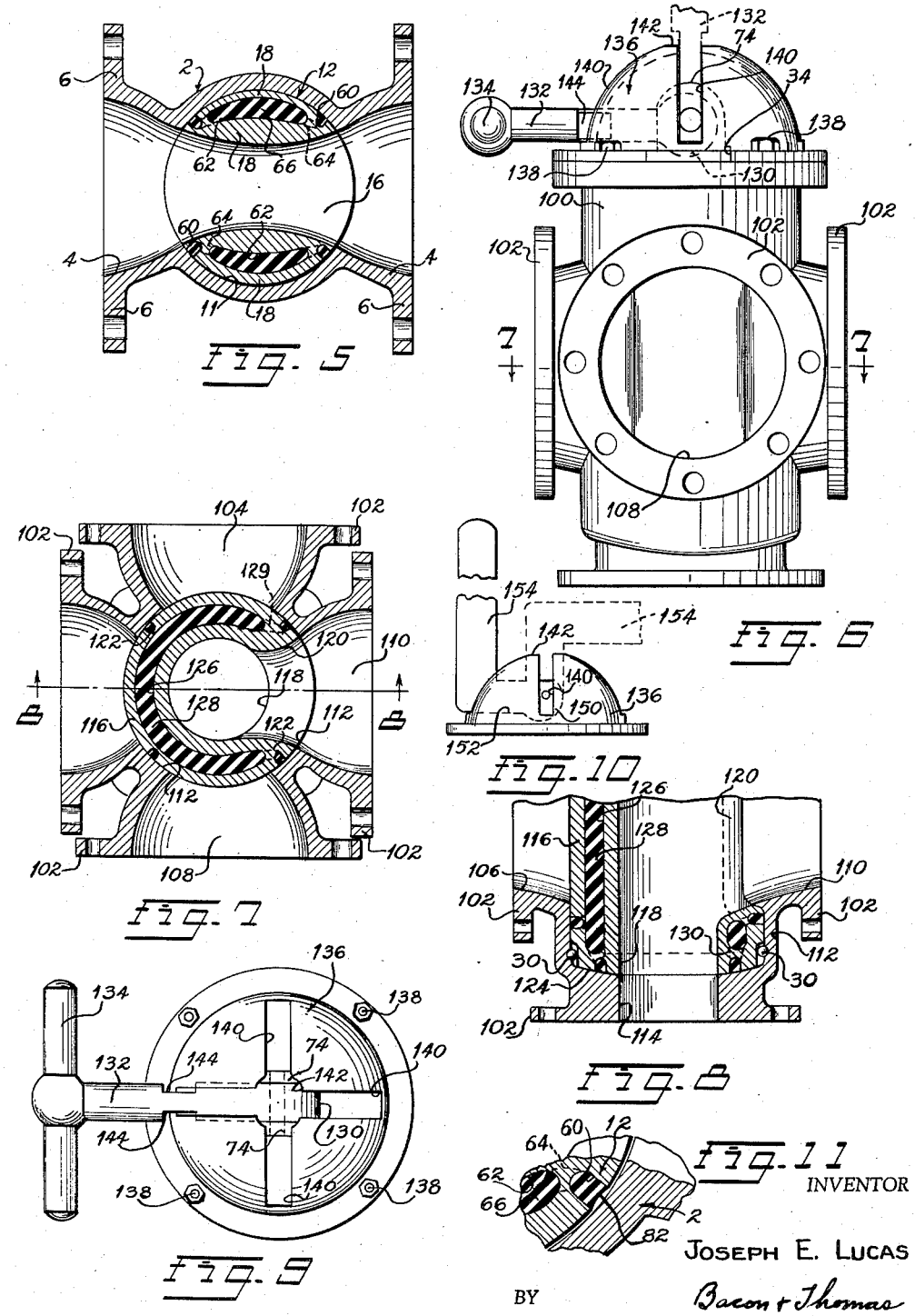

United States Patent Office 2,925,245
Patented Feb. 16, 1960

2,925,245

PRESSURE SEALED AND LOCKED VALVES

Joseph E. Lucas, Caracas, Venezuela

Application July 21, 1953, Serial No. 369,381

12 Claims. (Cl. 251—188)

This invention relates to valves, and is particularly concerned with valves having manually or other actuatable means for applying pressure to a pressure sealing medium between a valve closure member and a valve body member, and which medium is elastic and adapted to be pressed into positive sealing engagement with the valve members only at a time when the valve is fully open or fully closed. The arrangement of the manually or other actuatable means is such that during the application of pressure to the sealing medium, said means simultaneously effects locking of the valve closure member against movement from an indexed position relative to the valve body, to thus prevent abrasion of the sealing medium. In other words, pressure can be applied to the sealing medium only when the valve closure member is in predetermined positions in the valve body, and movement of the valve closure member from open to closed position, or vice versa, cannot be accomplished without first relieving the pressure on the elastic sealing medium. This precludes the possibility of the sealing medium being distended into abrasive engagement with the valve body at any time that the closure member is being moved relative to the valve body.

The specific embodiments described herein relate to plug valves wherein a rotary valve member constitutes the closure element, but it is to be understood that the principles of the invention may be adapted to other types of valves, and the description of plug valves herein is merely illustrative and not limiting.

The principal object of this invention is to provide a practical, positive, leakproof pressure seal between a valve closure member and a valve body.

A more specific object is to provide a valve having a positive, leakproof pressure seal effective when the valve is in either fully open or fully closed position, and which pressure seal must be released before the valve can be actuated from open to closed position, and vice versa.

Another object is to provide a valve having a manually or other operable pressure responsive sealing means that cannot be distended when the closure member of the valve is in any intermediate position between full open and full closed.

Another object is to provide a pressure sealable valve having a closure member that must be placed in a predetermined indexed position relative to the valve body before pressure can be applied to the sealing material, and wherein the closure member is automatically locked against movement from the indexed position simultaneously with the application of pressure to said sealing material.

Another object is to provide a through-flow or multiple way plug valve in which the plug is fitted with substantial clearance in the valve body to provide for ease of rotation, and wherein a seal is effected between said plug and body around all openings in said plug and body by a pressure responsive elastic sealing medium.

Still another object is to provide a valve of the rotary plug type wherein the plug member is easily rotatable and wherein a perfect seal can be effected between the plug and seating area of the valve body.

Another object is to provide an anti-friction mounting for a rotary plug valve which will enable the same to be easily and readily manipulated and which mounting will also support the valve body in a manner to prevent distortion thereof out of concentricity with the plug member.

A still further object is to provide means which can be readily assembled with a valve body for retaining a rotary plug in the valve body.

A still further object is to provide a valve adapted to be sealed by a pressure responsive sealing medium and wherein means is provided to compensate for any excess pressure condition that may develop in said medium.

Still further objects and advantages will become apparent to those skilled in the art as the description proceeds in connection with the accompanying drawings, wherein:

Fig. 1 is a side elevational view of a plug valve embodying the present invention;

Fig. 2 is a top plan view of the valve shown in Fig. 1;

Fig. 3 is a side elevational view of the rotary plug member alone, with the sealing means omitted therefrom;

Fig. 4 is a vertical sectional view of the valve shown in Figs. 1 and 2, taken substantially along the line 4—4 of Fig. 2 but with certain parts being shown in elevation;

Fig. 5 is a transverse sectional view taken substantially along the line 5—5 of Fig. 4;

Fig. 6 is a side elevational view of a different form of valve embodying the present invention;

Fig. 7 is a transverse sectional view taken substantially along the line 7—7 of Fig. 6;

Fig. 8 is a fragmentary vertical sectional view of the lowermost portion of the valve of Figs. 6 and 7, taken substantially along the line 8—8 of Fig. 7;

Fig. 9 is a top plan view of only the upper portion of the valve of Fig. 6;

Fig. 10 is a side elevational view of a further modified form of locking means showing only the upper portion of a valve of this embodiment; and Fig. 11 is a fragmentary transverse sectional view of a portion of a valve embodying the present invention and showing a detail common to the various embodiments.

The embodiment illustrated in Figs. 1 through 5 includes a valve body 2 provided with a through passage 4 and terminating in flange coupling elements 6, whereby the valve may be connected to pipes or conduits constituting the line to be controlled. The invention is not limited to a valve having flanged fastening means but may be readily incorporated in a valve provided with any other suitable or desirable fastening arrangement.

The valve body 2 comprises principally a generally cylindrical body section 8 closed at its lower end by a bottom wall 10 but being open at its top and defining, in effect, an open recess 14 in the valve body transverse to the through-passage 4. The portions of the recess 14 surrounding the ends of the passage 4 constitute valve seats, as will appear more clearly hereinafter. A rotary plug member, indicated generally at 12, is cylindrical in shape and fits freely within the recess 14 defined by the body section 8. The space in the recess 14 below the lower end of the plug serves as a lubricant reservoir. The plug 12 is provided with a transverse opening 16 adapted to be placed in alignment with the through-passage 4, as shown in Fig. 4, when the valve is in open position. The plug 12 may be rotated in the recess 14 to dispose the transverse opening 16 transversely of the through-passage 4 so that side wall portions 18 of said plug extend across and close said through-passage.

The plug 12 is provided with outwardly facing ball races 20 and 22 (Fig. 4) adjacent its upper and lower ends, respectively, and the valve body 2 is provided with inwardly facing ball races 24 and 26, respectively, opposed to the ball races in the plug member. The valve body 2 is provided with openings 28 communicating with the ball races 24 and 26, respectively, whereby the plug 12 may be inserted in the recess 14 and the bearing balls 30 then inserted through openings 28 into the space between the confronting races 20—24, and 22—26. Preferably, the space between each pair of opposed races is substantially completely filled with bearing balls 30 to thereby give the body member 2 support throughout its entire periphery, which support tends to resist deformation or distortion of the body in addition to mounting the plug for easy rotation.

The parts are preferably so dimensioned that there is clearance between the outer periphery of the plug 12 and the inner surface of the recess 14, thus enabling the plug to rotate therein without sliding friction at its periphery. A clearance of from about .01 to .02 of an inch is preferred. The lowermost ball race 22 in the plug 12 is of elongated cross-sectional shape and includes an arcuate portion 23 (Fig. 3), normally disposed above the balls 30, which merges into a cylindrical portion 23a, whereby the bearing balls 30 are engaged only at their innermost points and do not confine the plug against vertical movement. The ball races 20—24 at the upper end of the plug 12, however, are of a semicircular cross-sectional shape corresponding closely to the size and outline of the bearing balls 30 and serve to prevent axial movement of the plug in recess 14. Since the lowermost ball race 22 of the plug 12 is vertically elongated, it will be apparent that the plug 12 may freely expand or contract without unduly stressing the bearing balls 30, the valve body 2 or the plug 12.

The valve body 2 is provided with an annular groove 32 (Fig. 4) in its inner surface adjacent the upper end thereof and the plug 12 is provided with an upwardly extending axial stem 34. A plug cover or holding member 36, in the form of an annular ring, surrounds the stem 34 and rests on a shoulder 38 formed in the valve body substantially at the level of the upper end of the plug 12. The annular ring 36 lies below the groove 32 and is provided with an inner peripheral groove 40 and an outer peripheral groove 42 arranged to receive resilient O-ring sealing members, as shown. An annular groove 44 is provided in the upper surface of the plug 12 and a resilient O-ring is positioned therein to effect a further seal between the top of the plug 12 and the overlying annular ring 36. A split snap ring 46 is positioned in the aforesaid groove 32 and acts to hold the annular ring 36 against shoulder 38 and plug 12 to thus retain the plug in the valve body.

A bolt 47 (Fig. 2) having a tapered head 48 extends through an opening in the side of the valve body 2 with its tapered head 48 between the ends of split snap ring 46. By tightening the nut 50 on the bolt 47, its tapered head 48 is drawn outwardly to further expand and securely lock the split ring 46 in groove 32. It is to be noted that the upper surface of the annular ring 36 is tapered downwardly and inwardly, as at 52 (Fig. 4), so that radial expansion of the ring 46 forces the annular ring 36 downwardly, by cam action against surface 52, to effect seating thereof on shoulder 38 previously described.

If desired, the openings 28, through which the bearing balls 30 are inserted, may be closed by suitable lubricant or grease fittings 54 to permit ready lubrication of the ball bearing mounting for the plug 12.

The plug 12 may be further sealed with respect to the body 2 by means of additional resilient O-rings 56 and 58 positioned in grooves extending about the plug 12 axially inwardly of the ball races previously described.

The plug 12 is provided with further grooves 60 in its outer surface, arranged in the form of a series of loops bounding the ends of the transverse opening 16 and including vertically spaced portions in the wall portions 18 interconnecting said loops and in effect providing further loops outlining the wall portions 18 of the plug. The plug 12 is also provided with a hollow chamber 62 extending downwardly through the side walls 18, across the bottom of the plug below opening 16, across the top of the plug, and in communication with the hollow interior of stem 34. A plurality of openings or passageways 64 provide communication between the chamber 62 and the grooves 60. The chamber 62 and openings 64 are filled with a body of self-sustaining but flowable pressure responsive, solid elastic sealing material 66 and that body of material extends into and along grooves 60. The body of elastic material 66 abuts a plunger 68 slidably positioned in the hollow stem 34. "Belleville" washers or spring elements 70 are interposed between the plunger 68 and an upper plunger 72, for a purpose described later.

The stem 34 is provided with a pair of spaced upstanding ears 74 providing a pivotal support for a cam 76 pivoted between the ears 74 by a pin 78. The cam 76 is thus pivoted to the plug 12 about an axis transverse to the axis of rotation of the plug and is preferably provided with an integral handle 80. The cam 76 bears against the upper plunger 72 so that rotation of the cam clockwise from the position of Fig. 4 forces the plunger 72, springs 70 and plunger 68 downwardly to apply pressure to the body 66 of elastic material. In the position shown in Fig. 4, the cam 76 is in its "retracted" position so that pressure on the body of elastic material 66 is relieved. By swinging the handle 80 to extend upwardly, the cam 76 rotates about pin 78 and forces the plungers and springs 70 downwardly against the body of material 66 and causes that material to "flow" through openings 64 to apply pressure to the elastic material constituting the loops thereof arranged at the surface of the plug 12 in grooves 60. This application of pressure to the material in grooves 60 forces that material radially outwardly of the plug 12 into firm and sealing contact with the seating area of the walls of the recess 14 surrounding the passage 4. Since the grooves 60 and the material 66 are arranged to completely border the walls 18 and openings 16, it will be apparent that a complete seal is effected around through-passage 4 whether the plug 12 is in the open or closed position.

The material 66 may be natural rubber, synthetic rubber, "neoprene," "Thiokol," or any similar rubber like material. The material should be a solid capable of sustaining its own shape but should exhibit properties of hydraulic flow under pressure and a high degree of elasticity. The particular material selected should be inert to the fluids moving through the valve and should not deteriorate under the temperature conditions under which the valve operates. The portion of the material 66 in grooves 60 should be fairly hard, that is, having a Durometer hardness of about 55 to 60, but being soft enough to firmly seat and seal against nicks or scratches in the inner seating surfaces of the recess 14. That portion of material 66 in the chamber 62 and in openings 64 is preferably relatively soft, to approach the "flow" characteristics of a hydraulic liquid and preferably should have a Durometer hardness of about 35 to 45. These hardnesses are suitable for working pressures of about 250 p.s.i. and may be varied to suit operating requirements. The material 66 is preferably bonded to the plug 12, such as by vulcanization, to effect a complete and perfect seal in the grooves 60.

The material 66 in grooves 60 preferably does not completely fill the grooves, but, in its unstressed condition, has an outer surface 82 (Fig. 11) disposed inwardly of the outer surface of plug 12. As also shown in Fig. 11, there is substantial clearance between the plug 12 and the body 2 so that rotation of the plug does not result in sliding friction between any part of the plug and the inner surface of recess 14. It is highly desirable that the material 66 be completely out of engagement with the walls of the recess 14 during rotary movements of the plug 12 to thus avoid any possibility of abrasion and deterioration of the elastic sealing means 66.

Referring again to Figs. 1, 2 and 4, the valve body 2 supports a lock member 84 held thereon by bolts 86 or the like. The lock member 84 may be of any desired configuration and terminates at its upper end in an arcuate member 88 having a downwardly tapered conical surface concentric to the plug 12 and stem 34. The arcuate member 88 may be provided with stop flanges 90 at its ends and the inner periphery thereof is provided with notches 92. The stop flanges 90 and notches 92 are about ninety degrees apart, measured about the axis of plug 12, and are adapted to cooperate with the sector plate 94 to index the plug 12 in either its fully open or fully closed position.

The handle 80 and cam 76 are provided with an upstanding arcuate sector plate 94 having a radial edge 96 substantially parallel to but slightly spaced from the cone surface of arcuate member 88 when handle 80 is in the position shown in the drawings. The sector plate 94 is also provided with a stop shoulder 98 angularly disposed at about 90° from the edge 96 measured about the axis of pivot pin 78.

In the position shown in Figs. 1 and 4, the resilient material 66 is unstressed and the sector plate 94 is clear of the notches 92 in member 88. Under these conditions the handle 80 may be swung horizontally to rotate the plug 12 in valve body 2, and the elastic material in grooves 60 is out of contact with the valve body so no abrasion takes place. The bearing balls 30 insure easy rotation of the plug 12.

When the plug has been thus rotated to the desired fully open or fully closed position, the edge 96 of sector plate 94 engages one of the stop flanges 90 to indicate either the open or closed position of the valve. At that time, and only at that time, can the handle 80 be raised to pivot cam 76 about pin 78 and thus apply pressure to the material 66 and effect a perfect seal in the valve. Simultaneously with the application of pressure to the material 66, the periphery of the sector plate 94 enters a notch 92 and thus locks the plug 12 against rotation. By this means the plug 12 cannot be rotated while the material 66 is under pressure and in engagement with the walls of the recess 14. To effect rotary movement of the plug 12, the handle 80 must be lowered to the horizontal position shown, thus retracting the seal and unlocking the plug from the locking structure 84 whereupon it may be rotated to the other position. Any attempt to substantially rotate the handle 80 about the pin 78 while the plug 12 is in an intermediate position between fully open or fully closed position is prevented by engagement of the edge 96 of the sector plate 94 with the inner margin of the arcuate member 88.

The "Belleville" springs 70, previously described, consist of a pair of dished spring discs placed face-to-face, as shown, which are sufficiently stiff to transmit sealing pressure to the material 66. However, expansion of the material 66, for any cause, while it is under pressure, will cause the spring discs 70 to collapse sufficiently to prevent rupture or other damage to the plug 12 due to excess pressure in the material 66. Thus, the springs 70 constitute means for compensating for any excess expansion due to differences in the coefficients of expansion of the various materials comprising the valve.

The embodiment of the invention shown in Figs. 6 to 9 involves the same inventive concept as the embodiment of Figs. 1 to 5 but illustrates a modified form of valve wherein a plurality of passageways may be selectively opened and/or closed by a rotary plug. In this embodiment a generally cylindrical valve body 100 is provided with a plurality (in this instance four) of lateral openings terminating in suitable attachment flanges 102. The lateral openings 104, 106, 108 and 110 (see Fig. 7) all communicate with a central cylindrical recess 112. The bottom of the valve body 100 is provided with a further opening 114 (Fig. 8) in axial alignment with the axis of the cylindrical body 100 and may define an inlet or an outlet opening, depending upon the fluid circuit being controlled. A rotary plug 116 is rotatably mounted in the cylindrical body portion 100 and is provided with an opening therethrough in the form of a generally L-shaped passageway. One leg 118 of the passageway extends axially downwardly of the plug in alignment with the opening 114. The other leg 120 of the passageway extends laterally of the plug 116 in position to be rotated into alignment with any selected one of the lateral openings 104 to 110 of the valve body 100. Thus, the plug 116 may be rotated to establish communication between any one of the openings 104 to 110 and the end opening 114.

The upper portion of the plug 116 is preferably constructed in a manner the same as that described in connection with Fig. 4 and need not be further described here. The outer surface of the plug 116 is provided with a plurality of looped grooves 122 arranged similarly to those in the embodiment of Figs. 1 to 5, and in each position of the plug 116 a looped groove 122 surrounds each of the openings 104 to 110 (Fig. 7) and a further annular groove 124 (Fig. 8) surrounds the opening 114 at the bottom of the valve body 100. An interior chamber 126 of the general cross-sectional shape shown in Fig. 7 is filled with a body 128 of the elastic material previously described, which extends therefrom through openings 130 into the grooves 122 and 124. It will be apparent that the application of pressure to the material 128 will effect a perfect pressure seal about each of the openings in the valve body 100.

Means for applying pressure to the body 128 through plungers (not shown) corresponding to those previously described, consist of a cam 130 (Fig. 6) pivoted between the upstanding ears 74 of the stem 34 of plug 116. The cam 130 has a handle 132 affixed thereto and the handle may be provided with a cross bar 134.

Instead of employing the locking member 84 of Figs. 1 to 5, this embodiment is provided with a hollow hood 136, which may be dome-shaped as shown, and secured to the upper end of valve body 100 by means of cap screws 138 or the like. The hood or dome 136 is provided with a plurality of radial slots 140 terminating at their upper ends in a central opening 142 aligned with the axis of rotation of plug 116. The slots 140 are located at positions corresponding to the radial position of handle 132 when the lateral leg 120 of the opening through plug 116 is aligned with the respective lateral openings 104 to 110 of the valve body. The handle 132 may be provided with side surfaces 144 adapted to engage the sides of the slots 140. When the parts are in the position shown in Figs. 6 and 9, the cam is in position to hold the body of material 128 under pressure to effect the described seal and the handle 132 extends laterally through one of slots 140, thus locking the plug 116 against rotation. When it is desired to rotate the plug to a different position, the handle 132 must first be swung to an upright position, as indicated by dotted lines in Fig. 6 to first rotate the cam 130 to a position where pressure on the material 128 is completely relieved. The handle 132 then extends upwardly through the central opening 142 and in axial alignment with the plug 116 and stem 34, whereupon the cross bar 134 constitutes a handle whereby the plug may be readily rotated to another position. After such rotation, swinging of handle 132 downwardly into a selected groove 140 first locks the plug 116 against further rotation and rotates the cam 130 to again apply pressure to the material 128.

Other details of construction in this modification may be identical to corresponding details described in connection with the first embodiment.

Fig. 10 illustrates a further modified form of operating handle and illustrates therewith only the hood 136 of the valve. In this modification, the cam 150 is provided with an integral locking portion 152 and a handle portion 154. The locking portion 152 and the handle portion 154 are arranged at right angles to each other, as shown, so that when in the locked position shown in Fig. 10 by solid lines, the handle portion extends upwardly. Upon swinging the handle portion to the horizontal position shown by dotted lines, the locking portion 152 then extends vertically upwardly, through the central opening 142 wherein the plug controlled thereby may be readily rotated. The handle portion 154 thus constitutes means for actuating the cam 150 for applying pressure to a sealing medium as well as a lever to facilitate rotation of the plug.

Clearly, the invention thus far described may readily be adapted to valves having a different number of lateral openings, with or without the axial opening 114. For instance, the opening 114 could be eliminated and the plug formed with only a lateral recess in one side, of sufficient width to span and connect the inner ends of two adjacent lateral openings in the valve body, or a plug as the plug 12 could be used in lieu thereof to connect diametrically opposed openings 104—108 and 106—110.

Furthermore, the resilient sealing material could be in grooves and suitable chambers in the valve body rather than in the rotary plug. In such case the means for applying pressure to the elastic material could readily be arranged to engage and lock a separate actuator for rotating the plug.

While a limited number of specific embodiments of the invention are shown and described herein, the invention is not limited thereto but encompasses all other embodiments falling fairly within the scope of the appended claims.

I claim:

1. A valve comprising, a body member having a passageway therethrough and a valve member movably mounted in said body member for movement between an open position and a closed position wherein said passageway is closed thereby, said members having closely adjacent opposed portions surrounding said passageway when said valve member is in each of said positions, a unitary body of self-sustaining but flowable elastic material carried by one of said portions in sealing relation thereto, movable means for pressing and holding said elastic material against the other of said portions to seal the space between said portions around said passageway in each of said positions of said valve member, and means to lock said valve member against movement in said body member while said elastic material is held in sealing relation to said other portion.

2. A valve comprising, a valve body having at least one passageway therethrough terminating in inlet and outlet openings, a valve member mounted in said valve body for movement between an open position wherein free flow of material from said inlet to said outlet opening is permitted and a closed position wherein at least one of said openings is closed, said valve member having a wall portion for closing said one opening, said valve body having a continuous surface surrounding said one opening and closely adjacent said wall portion when said valve member is in closed position, a continuous groove in said wall portion complementary in outline to said continuous surface and covered thereby when said valve member is in closed position, a unitary body of self-sustaining flowable elastic material substantially filling said groove, a handle for moving said valve member between opened and closed positions and for applying pressure to said body of elastic material, locking means cooperating with said handle and arranged to lock said valve member against movement relative to said valve body when said handle is in position to apply pressure to said elastic material, said valve member comprising a body having a closed chamber therein, and a passageway from said chamber into said groove, a hollow stem communicating with said chamber, said body of elastic material filling said chamber and said last-named passageway, a plunger slidable in said stem and engaging said body of elastic material, said handle including a portion adapted to move said plunger inwardly of said stem to apply pressure to said body of elastic material, resilient pressure transmitting means between said plunger and said portion of said handle, whereby to permit expansion or contraction of said body of elastic material while said handle is in pressure applying position, said means comprising dished resilient spring elements.

3. A plug valve comprising, a valve body having a passageway therethrough, a plug rotatably mounted in said valve body for rotation about an axis transverse to at least a portion of said passageway, said plug having an opening extending therethrough, whereby said plug may be rotated to an open position wherein said opening is aligned with said passageway or to a closed position wherein said opening is not so aligned and said passageway is closed, said plug carrying a unitary body of self-sustaining but flowable elastic sealing material, said body of material including closed loops thereof at the surface of said plug and arranged to surround said passageway when said plug is in each of said positions, and means for pressing and holding said loops in sealing relation to the adjacent portions of said valve body.

4. A valve as defined in claim 3, wherein said loops are positioned in grooves in the outer surface of said plug and bonded to the side walls of said grooves, the surface of said material, when relaxed, being within said grooves inwardly of the outer surface of said plug.

5. A valve as defined in claim 3, wherein a portion of said plug extends axially thereof outwardly of said valve body and wherein said last-named means includes a handle pivoted to said extended portion of said plug on an axis transverse to the axis about which said plug rotates and cam means actuatable by pivotal movement of said handle about said extended portion for pressing and holding said loops in said sealing relation, and cooperating means on said handle and valve body arranged to interengage and lock said plug against rotation when said handle is in pressure applying position, in each of said positions of said plug, to press said loops against said valve body portions.

6. A valve as defined in claim 3, wherein said loops are positioned in grooves in the outer surface of the plug, said plug having a chamber therein and passageways providing communication between said chamber and said grooves, a hollow stem projecting axially of said plug and outwardly of said valve body, a plunger slidable in said stem, said body of elastic sealing material filling said chamber and passageways and abutting said plunger, a cam pivoted to said stem on an axis transverse to the axis about which said plug rotates, said cam being arranged to move said plunger inwardly of said stem and thereby transmit pressure through said body of elastic material to said loops to effect a seal with said valve body, a handle on said cam, and cooperating locking means on said handle and valve body arranged to interengage and lock said plug against rotation when said cam is in pressure-applying position.

7. In a plug valve, a valve body having a passageway therethrough, a plug extending across said passageway and rotatable about an axis transverse thereto, an opening in said plug so arranged that rotation of said plug opens or closes said passageway, inner ball races around said plug adjacent the ends thereof, outer ball races in said valve body and opposing said inner ball races, a plurality of bearing balls between each pair of opposed races and supporting said plug for rotation about said axis, a unitary elastic sealing body carried by said plug inwardly of said ball races, and means on said plug for releasably pressing said sealing means against said valve body, said valve including an O-ring seal between said plug and said valve body axially inwardly of each of said ball races.

8. A plug valve as defined in claim 7, wherein the spaces between said opposed ball races are substantially completely filled by said bearing balls.

9. A plug valve as defined in claim 7, wherein said plug and elastic sealing body are normally held spaced from adjacent portions of said valve body by said bearing balls.

10. In a plug valve, a valve body having a recess open at one end of said valve body, a valve plug in said recess, means supporting said plug for rotation in said recess about an axis extending through the open end of said recess, an axial stem on said plug extendnig outwardly of said recess, an annular holding member between said stem and an outer portion of said recess, said holding member engaging an end of said plug, and a split-ring retainer engaging a groove in said valve body and holding said member against said plug.

11. A plug valve as defined in claim 10, wherein said annular holding member is provided with an inwardly tapered outer surface, whereby expansion of said split-ring into said groove forces said holding member inwardly of said recess into firm holding engagement with said end of said plug.

12. A plug valve as defined in claim 11, wherein annular resilient sealing means are disposed between said holding member and said valve body, between said holding member and said stem, and between said holding member and the adjacent end of said plug.

References Cited in the file of this patent

UNITED STATES PATENTS

| | | |
|---|---|---|
| 1,179,188 | Kanty | Apr. 11, 1916 |
| 1,741,141 | Baker | Dec. 31, 1929 |
| 2,023,349 | Whittle | Dec. 3, 1935 |
| 2,229,871 | Penick | Jan. 28, 1941 |
| 2,364,700 | Eplett | Dec. 12, 1944 |
| 2,372,869 | Wheatley | Apr. 3, 1945 |
| 2,388,827 | Carter | Nov. 13, 1945 |
| 2,431,437 | Van Der Werff | Nov. 25, 1947 |
| 2,471,941 | Downey | May 31, 1949 |
| 2,539,106 | Schenck | Jan. 23, 1951 |
| 2,552,376 | Hann | May 8, 1951 |
| 2,552,991 | McWhorter | May 15, 1951 |
| 2,565,244 | Laurent | Aug. 21, 1951 |
| 2,567,032 | Schmidt | Sept. 4, 1951 |
| 2,665,879 | Housekeeper | Jan. 12, 1954 |
| 2,699,798 | Hawkins | Jan. 18, 1955 |
| 2,734,714 | Knox | Feb. 14, 1956 |
| 2,738,158 | Fugile | Mar. 13, 1956 |

FOREIGN PATENTS

| | | |
|---|---|---|
| 516,614 | Great Britain | of 1939 |